United States Patent [19]

Johnson et al.

[11] 3,985,913

[45] *Oct. 12, 1976

[54] CONDIMENT ENCAPSULATION BY SPRAY DRYING

[75] Inventors: Lawrence A. Johnson, Medina, Ohio; Edgar J. Beyn, Annapolis, Md.

[73] Assignee: SCM Corporation, New York, N.Y.

[ * ] Notice: The portion of the term of this patent subsequent to Apr. 6, 1993, has been disclaimed.

[22] Filed: July 31, 1974

[21] Appl. No.: 493,325

[52] U.S. Cl. ............................ 426/650; 426/96; 426/98; 426/103; 426/471
[51] Int. Cl.² ............................................ A23L 1/22
[58] Field of Search ............... 426/89, 96, 98, 103, 426/212, 213, 221, 222, 223, 364, 369, 380, 471, 650, 658, 651, 656, 657

[56] References Cited
UNITED STATES PATENTS

| | | | |
|---|---|---|---|
| 2,694,643 | 11/1954 | Robinson et al. | 426/98 |
| 3,121,639 | 2/1964 | Bauer et al. | 426/471 X |
| 3,385,710 | 5/1968 | Reymond et al. | 426/96 X |
| 3,621,902 | 11/1971 | Okada et al. | 426/471 X |

*Primary Examiner*—A. Louis Monacell
*Assistant Examiner*—Esther L. Massung
*Attorney, Agent, or Firm*—Jerry K. Mueller, Jr.

[57] ABSTRACT

An improvement in process for producing encapsulated condiment particles by spray drying wherein a special surface-coating step is done while subjecting such particles to spray drying.

4 Claims, 2 Drawing Figures

CONDIMENT-CONTAINING DISPERSION

COLD AIR SURFACE COATING DISPERSION

COLD AIR SURFACE COATING DISPERSION

Fig. 1

HOT AIR

DRY PRODUCT TO RECOVERY SYSTEM

CONDIMENT ENCAPSULATION BY SPRAY DRYING

BACKGROUND OF THE INVENTION

This invention relates to an improvement in process for producing condiment particles by spray drying and more particularly to spray drying with a special coating step.

A number of techniques and products have been proposed for producing condiment particles. One such technique is to compound an aqueous emulsion of fatty substance, sugar, and gelatin, then spray dry the emulsion to form particles consisting essentially of an inner core rich in fat and a dry outer layer rich in sugar and gelatin. Another such technique is to compound an aqueous emulsion of oil, a mixture of whipping agents, sugar, and optionally emulsifiers and stabilizers, and spray dry the emulsion to form a dry edible composition whippable with liquid such as milk to form a topping. A further technique is to form a melt of sugar, edible vegetable fat, and cocoa, thereafter chilling the melt and granulating it to form dispersible chocolate drink particles. The condiment particles also can be produced according to conventional spray chilling techniques, wherein a fluent mixture of the fat and condiment are sprayed in the form of droplets, the fat being congealed by cooling thereafter.

Advantages of this improvement over prior proposals include the fact that a protective or decorative coating on the core particles is applied directly to the outside of the core particle to coat or reinforce any outer layer which may be indigenous to the resulting spray dried particles. The core and coating are simultaneously dried or hardened if both are dryable; otherwise, just the coating is dried.

SUMMARY OF THE INVENTION

The instant improvement in process for producing condiment particles by spray drying wherein a fluent, sprayable dispersion containing said condiment is sprayed into a heating zone for removing volatile matter therefrom and generating dry particles comprises:
intercepting the spray of said dispersion containing said condiment with a further spray of edible surface coating dispersion convertible by spray drying into an ostensibly dry surface coating, as said further spray being directed for coating spray particles of said dispersion containing said condiment with said further spray;
and drying the resulting composite particles in said heating zone.

The coated product of this process is a particle having a condiment-laden core and an ostensibly drying coating thereon, suitably sacchariferous or proteinaceous.

DESCRIPTION OF THE DRAWINGS

FIG. 1 shows a useful nozzle tip assembly in cross-sectional elevation. The condiment-containing dispersion flows through passage 11, which passage is defined by tube wall 12. Annular to tube wall 12 is passage 13 conveying cold air transverse to the jet of condiment-containing dispersion exiting from passage 11 and atomizing this jet. Annular passage 13 is defined by tube wall 12 and the inner wall of interior casing 14.

A pair of peripheral passages 16 and 17 (180° opposed and small in diameter) convey the surface coating dispersion through exterior casing 18 and discharge it as a spray into the zone of atomized condiment-containing dispersion. There can be additional such peripheral passages, generally opposed to each other and tending to intersect if unimpeded into a conical pattern looking down, but when the nozzle is in full operation, the surface coating dispersion is atomized quite thoroughly and additional such streams of surface coating dispersion tend to make more perfect coatings on the core particles rich in condiment. Lagging 19 insulates the nozzle assembly from substantial heat loss. Obviously, more than one kind of surface-coating dispersion can be used for the coating spray, each projected from different spraying outlets.

FIG. 2 shows a typical spray dryer for this process schematically in vertical cross-section elevation. Shell 21 (the heating zone) is composed of a vertical cylindrical body with a tapered base. Hot air enters line 26 and is at a suitable temperature for drying the surface coating dispersion that coats the spray particles of condiment-containing dispersion. Typically the hot air will range in temperature from about 200° to about 400° F. The hot air from line 26 enters shell 21 through passages defined by louvers 28 and 29, which louvers are positioned for causing the hot air and coated particles to swirl in and down through said heating zone 21. Condiment-containing dispersion enters the apparatus through line 22 along with a flow of cold air through line 23 and surface-coating dispersion through line 24. These are discharged inwardly into shell 21 through nozzle 27, typically a nozzle like that shown in FIG. 1.

The surface coating dispersion drys as the particles flow cocurrently with the swirling hot air in the heating zone. The spent air (typically about 100+° F.) and dried product are discharged from outlet 29 located at the tapered base of shell 21 and into a recovery system (not shown). Such recovery system generally comprises a cyclone separator for collection of the dry product, and this even can be followed by a bag filter or like solids separator for additional recovery of undersized values. Additionally, the product can be dried further by gas fluidization.

The spray dryer can be operated under superatmospheric or subatmospheric pressure, although atmospheric pressure whenever feasible is preferred for efficiency and economy.

DETAILED DESCRIPTION OF THE INVENTION

A condiment for purposes of this invention can be a liquid, vapor, or solid phase seasoning, flavoring, salting, sweetening, souring, spicing, proteinaceous material, and/or coloring ingredient or ingredient mixture suitable for producing or enhancing a texture, flavor and/or color in an edible product. It can include or consist of single or mixed pungent or spicy solids, flavoring oils, essences, oleoresins, extracts and other zesty flavorings, for example oleoresin of ginger, oils or extracts or solid forms of sage, pimento, coriander, parsley, garlic, caraway, nutmeg, cardamom, cloves, celery, etc. It also can include or consist of: edible titanium dioxide in permissible amounts, especially those treated in accordance with U.S. Pat. Nos. 3,592,940 and 3,579,356; monosodium glutamate; frequently sticky or liquid or semi-liquid food emulsifiers or blends thereof, especially those blended with normally solid lipoidal material, such emulsifiers being one or more alkoxylated or plain partial glycerides of edible fatty acids, lecithin, hydroxylated lecithin, alkoxylated and plain glycol esters of edible fatty acids, ethoxylated or plain sorbitol or sorbitan esters of fatty acids, food emulsifiers in salt form such as calcium stearyl lactylic acid, edible gums, stabilizers, and other food ingredients such as gelatin, soy protein, sodium carboxymethyl cellulose, algin and its salts, edible microcrystalline cellulose, hydroxypropyl cellulose, dextrose, sucrose, hydrolyzed cereal solids corn syrup, sorbitol, manitol, saccharin, casein and its salts, cornstarch, wheat flour, rice flour, breadcrumbs, and the like; milk and milk products in concentrated or dried form such as whole milk, nonfat milk, buttermilk, sweet cream, whey, butter oil, lactose or the like and mixtures thereof; egg albumin, soy protein, or like proteinaceous materials and mixtures thereof; lipoidal materials such as an edible vegetable fat, animal fat, so called "low molecular" fats, acetoglycerides, free higher ($C_{12-26}$) fatty acids, often blended with a fatty food emulsifier such as a monoglyceride, diglyceride or a partial glycolate of fatty-forming ($C_{12-26}$) fatty acids, glycerol mixed esters of water soluble hydroxy carboxylic and higher fatty acids, polyoxyalkylene derivates of sorbitan esters of higher fatty acids, glycol esters of higher fatty acids and their polyoxyalklene derivatives, higher fatty acid esters of polyglycerols and their polyoxyalklene derivatives, tartaric acid esters of higher fatty acid esters of citric acid such as dipalmityl or distearyl citrate, sucrose esters of higher fatty acids, alkoxylated partial higher fatty esters of polyhydric alcohols having from 2 to 6 carbon atoms, and mixtures of same. Thus, lipoidal material for the instant purpose includes triglycerides, fatty emulsifiers, and mixtures of same.

If the condiment is highly volatile, or liquid, or normally vaporous, it can be blended with lipoidal material such as hard fat and processed (under superatmospheric pressure where necessary or desirable) to retain it for handling and conversion into particultes.

Additives which can be included as a fraction (typically a very minor fraction) of the lipoidal material condiment include fungistats, bacteriostats, silicone oil, flavorants, odorants, anti-oxidants, tints, dyes, and colorants.

Preferably the lipoidal material (including a mixture of lipoidal materials) is normally solid. By a normally solid lipoidal material is meant that such material at 90° F., advantageously at 95° F., and preferably at about 110°–180° F (with about 115°–120° F. being specially preferred) is ostensibly dry to the touch, freeflowing in small (for example 60–100 mesh) beaded form, and such beads do not tend to agglomerate strongly or appreciably or to deform appreciably even when standing unpacked to a depth of 6 inches high in a 1 inch diameter cylinder for 24 hours at 75°–80° F.

The edible surface coating dispersion comprises an edible coating material dispersed in a fugitive carrier or solvent, e.g. water or ethanol, wherein the carrier or solvent can be volatilized in the heating zone to leave a dry surface coating residue. Edible surface coatings can comprise secchariferous material, proteinaceous material, an edible gum, an edible wax, an edible resin, a colorant, or like edible materials suitable for spraycoating core particles according to the precepts of this invention, and mixtures thereof.

Typical sacchariferous surface coating materials include sucrose, dextrose, hydrolyzed cereal solids, corn syrup solids or other solids-forming sugars and mixtures thereof. Artificial sweeteners such as saccharine also can be used as at least a portion of the surface coating and can be considered sacchariferous for this use. The sacchariferous material alone can form the dry surface coating or it can be compounded with other surface coating proteinaceous materials, edible gums, edible resins, edible waxes or the like, and mixtures thereof.

Typical proteninaceous surface coating materials include milk and milk products in dried form such as whole milk, nonfat milk, buttermilk, whey, and lactose; egg albumin, casein and its salts, soy protein, algin and its salts or like proteinaceous materials, and mixtures thereof.

Edible gums as the surface coating material can be guar gum, gum arabic, gum tragacanth, agar, carageen, dextrin or like edible gums, and mixtures thereof. Anti-caking aids also can be included such as tricalcium phosphate and sodium aluminum silicate.

Edible waxes can be paraffin wax, beeswax, carnauba wax and like edible waxes, and mixtures thereof. A glossy shine to the final composite particles (having a dry coating of materials other than wax) can be achieved by coating the interior wall of a heat revolving pan with an edible wax and rolling the composite particles therein. The edible wax coats the particles, thereby imparting the glossy shine to said particles.

Edible resins include shellac, methylcellulose, ethyl cellulose, terpene resins, carboxymethylcellulose and its salts, carboxyethyl cellulose, hydroxy propylcellulose, hydroxyethylcellulose, hydroxypropylmethylcellulose, and certain synthetic carboxylic polymers such as carboxypolymethylene polymers neutralized with an appropriate amine, or like edible resins and mixtures thereof.

The edible surface coating dispersion additionally can be colored and/or flavored if desired. Thus, the final composite product can have the coating, the core or both colored and/or flavored either the same or in different combinations of coloring and flavoring.

The carrier or solvent portion of the edible surface coating dispersion can be water, a food-grade alcohol or like appropriate solvent. The solvent must be volatizable in the heating zone, ordinarily leaving at most an innocuous residue, and any such solvent residue deposited with the surface coating material must be ingestible.

In practicing this invention, the first step is to form and spray a dispersion containing the condiment. An already normally liquid condiment can be sprayed (atomized) in its liquid form for purposes of this step. A vaporous condiment to be coated is best dissolved or sorbed into a fluent, high-boiling lipoidal material. Alternatively, such condiment can be sorbed on an edible solid and handled like a solid condiment. Certain solid condiments being coated can be melted in order to spray the condiment, provided that the desired organoleptic characteristics of such condiment are not grossly damaged by said melting. Alternatively and preferably, however, solid and most liquid condiments can be coated by dispersing them in finely divided state or dissolving them in a sprayable lipoidal matrix for efficiency and economy. Condiments which tend to swell upon exposure to moisture (for example, wheat flour) and those which are chemically activated by exposure to moisture, (for example, moderate heat-resisting baking powder) are dispersed in finely divided state or dissolved in the sprayable lipoidal matrix so that the moisture content of the surface-coating dispersion does not so adversely affect or prematurely decomposed them.

Forming a condiment-containing dispersion for the instant purpose means then converting (by melting, sorbing, dissolving or suspending) the condiment in such form that it can be atomized by conventional means, for example airless spray, gas-assisted spray, spinning disc, or the like. Average particle size (diameter) for spraying can be as low as a few microns on up to 100 microns or even larger. While certain product particles preferably are at about 5 microns (average), many condiment products in our resulting spray-dried coated forms are advantageously of about 80–90 microns average diameter. Thus, the atomizing device, e.g., nozzle, used is made to produce such size, and solids used are, of course, fine enough to preclude nozzle stoppage.

The spray containing the condiment is intercepted with a further spray of edible surface-coating dispersion convertible by spray drying into a dry surface coating. The multispray pattern usually is formed by use of a multicomponent spray nozzle. The resulting composite particles thereupon pass into a heating zone, therein drying the condiment core and coating simultaneously if both are dryable, otherwise, drying only the coating. Such drying is accomplished by vaporization of volatile matter from the particles by hot air. However, any suitable drying gas or vapor can be utilized according to the precepts of this invention, as well as infrared heating or microwave heating. The hot air preferably passes cocurrently with the coated particles in said heating zone for efficiency and economy. However, when the final particle size (effective diameter) becomes as large as 80–100 microns or larger, a countercurrent or cross flow heating gas stream can be employed appropriately. Thus, a heating gas stream can be countercurrent, cocurrent, or crosscurrent to the spray particles as is necessary or desirable (for example, to resist or promote classification).

The dry coated product composite particles leave the heating zone with a flow of spent gas (generally at about 100°–200° F.). The separated composite particles (separated from the spent gas by cyclone, filter medium, or the like,) can be packaged, added to other ingredient mixtures, etc., as discharged, although it is often advantageous to cool the particles to about room temperature prior to such packaging, etc. The particles can be cooled after separation from the spent gas vehicle by exposure to cool air or other suitable cooling means.

The size (effective diameter) of the coated condiment particles and the proportion of condiment to surface coating material can be varied over a wide range. This is dependent upon the condiment-containing dispersion spray particles sizes, the flow rates of the streams, and the concentration, and spray particle size and pattern of surface-coating material in the surface-coating dispersion. Final coated particles sizes can range from about 5 microns or smaller to 150 microns or larger. The weight proportion of condiment to surface-coating material in the dry coated particles ordinarily will range from about 0.1:1 to about 100:1, depending upon the intended usage of the coated particles. The size of and the condiment content in the coated particles each can be varied over the above ranges to produce particles of the desired size and condiment content, and particles can be classified as to size after production for particular use.

The coated particles of the instant process will have a condiment-laden core and an ostensibly dry coating thereon. For the purpose of this application, an ostensibly dry coating is neither sticky nor tacky to the touch. When the condiment particles are thoroughly coated with such dry coating, they will resist agglomeration, even when standing for 24 hours in a depth of as much as six inches in unpacked condition at a storage temperature of 75° F. They will tend to be free flowing.

Because the dry coating can be hydratable upon exposure of the particles to moisture (for example, a sucrose coating) and the coating thereby becoming sticky, it may be necessary to handle and/or package the coated particles in the absence of humidified air or other moisture-containing sources and/or to include a dehumidifying material in the package product.

The condiment-laden core is afforded a measure of: protection (by the dry coating thereon) against deterioration caused by exposure to the atmosphere; control for release of the condiment into a foodstuff or the like in which it is compounded, the surface coating dissolving to release the condiment at a desired, rather than at an accidental juncture; prevention of undesired interaction between condiment and its surrounding materials in a food, drug, or cosmetic; and prevention of the condiment coloring and/or flavoring ingredient to bleach, run, dilute or evaporate. It is desirable, in some instances, that the coating serve only as a decorative (colored) and/or flavored coating, or in others as an aid in handling difficult-to-handle condiments, such as those that are a sticky, liquid or seim-liquid under normal handling conditions.

The amount of such protection is dependent upon the specific-coating material chosen, the coating thickness, and the completeness of the coating on the condiment core. Ordinarily, there will be very little or no condiment at the surface of the coated particles, but even an incomplete coating is often adequate for many uses of the particles.

It should be noted that fines emanating from the spray pattern of condiment particles, generally such fines being most prominent at the periphery of such spray pattern, can be collected and aggregated into larger, more desirable sized particles by the spray of surface coating dispersion as it intersects the condiment spray. Such fines collection process is disclosed by the following application filed on even date herewith: Edgar J. Beyn Ser. No. 493,323, entitled "Equipment and Process for Spray Drying", which disclosure is expressly incorporated herein by reference.

Coating of the spray of condiment particles by the spray of surface coating dispersion can be improved additionally by subjecting each such spray to an equal, but opposite electrostatic charge (for example, a positive charge to the condiment spray particles and a negative charge to the surface coating spray particles). Such oppositely charged spray particles would tend to be attracted to each other to further promote encapsulation of the condiment spray particles by the surface coating spray particles, especially if the condiment spray has a relatively higher surface tension than the surface coating dispersion has. U.S. Pat. No. 3,208,951 discloses such a method of encapsulation of a liquid (for example, water, glycerine or ethylene glycol) in aerosol form by an encapsulating substance (for example, a wax or synthetic resin) wherein the two sprays are given equal, but opposite electrostatic charges to produce 10–60 micron encapsulated particles. The disclosure of said reference is expressly incorporated herein by reference.

The following example shows how the instant process can be practiced, but should not be construed as limiting the invention. In this specification all parts are parts by weight, all percentages are weight percentages, and all temperatures are in degrees Fahrenheit unless otherwise expressly indicated.

EXAMPLE

Referring to FIG. 2, a molten blend of 10% five-fold orange oil and 90% triglyceride fat (specification C.M.P. of 124°–130°) is introduced through line 22 at the rate of 125 ml./minute and temperature of 145°. Three SCFM (measured at 760 mm. Hg and 70°) of air at 70° passes through line 23. Edible shellac solution (3% is ethanol) at 70° passes through line 24 at the rate of 300 ml. per minute. These liquid flows are atomized in nozzle 27, said nozzle having a tip like that described in connection with FIG. 1. The net spray is directed downwardly and cocurrently into a flow of hot air (250°) entering shell 21 through louvers 28 and 29 at a rate of about 57 SCFM. Dry product, about 5–10 micron average particles size, passes with the spent air through outlet 29 at temperature of about 100° and is separated from such air by the collection system. The product is appreciably coated with shellac enrobing a core rich in orange oil.

We claim:
1. A process for producing condiment particles by spray drying in a heating zone which comprises:
    forming a first spray of said condiment dispersed in normally solid lipoidal material in fluent state, said forming of said first spray being assisted with a flow of cold gas;
    intercepting said first spray with a second spray of an edible surface coating material dispersed in a fugitive carrier and convertible by spray drying into a dry surface coating, said second spray being directed at an angle for coating said first spray with said second spray; and
    drying the resulting composite particles in said heating zone.
2. The process of claim 1 wherein said surface coating is sacchariferous.
3. The process of claim 1 wherein said surface coating is proteinaceous.
4. The process of claim 1 wherein the spray-formed composite particles pass substantially cocurrently with a flow of heating gas in said heating zone and are collected by separation from said gas.

* * * * *